United States Patent [19]

Ciancibello et al.

[11] 4,224,688
[45] Sep. 23, 1980

[54] DIGITAL CONFERENCE CIRCUIT

[75] Inventors: Carmine A. Ciancibello; Ernst A. Munter, both of Ottawa, Canada

[73] Assignee: Northern Telecom Limited, Montreal, Canada

[21] Appl. No.: 956,257

[22] Filed: Oct. 30, 1978

[51] Int. Cl.³ .............................................. H04Q 11/04
[52] U.S. Cl. ...................................................... 370/62
[58] Field of Search ......................... 179/18 BC, 1 CN

[56] References Cited

U.S. PATENT DOCUMENTS

| 3,699,264 | 10/1972 | Pitroda et al. | 179/18 BC |
| 4,007,338 | 2/1977 | McLaughlin | 179/18 BC |
| 4,054,755 | 10/1977 | Lee et al. | 179/15 AT |

Primary Examiner—Thomas W. Brown
Attorney, Agent, or Firm—Robert C. Hogeboom

[57] ABSTRACT

A digital conference circuit for a digital telephone switching network is provided, connected between a receive TDM (time division multiplex) bus carrying PCM (pulse code modulation) words from the conferees to the conference circuit and a transmit TDM bus carrying PCM words from the conference circuit to the conferees. For a conference involving N conferees, N−1 shift registers serially interconnected are employed. As each PCM word, in a distinct time slot on the receive TDM bus, reaches the conference circuit it is entered into the first shift register in the series. The PCM words already stored in the shift registers are "shifted" along the series connection of shift registers by one register each time a new PCM word is entered in the first register, with the PCM word previously stored in the final shift register simply being "lost." Circuitry within the conference circuit monitors the binary value of the PCM words stored in the registers and during the time slot that one PCM word is being received from a conferee, the PCM word previously stored in one of the N−1 registers that has the largest absolute binary value is output on the transmit TDM bus and it is received by the conferee who is "talking" during that same time slot (referenced to the conference circuit). With such a conference circuit a conferee never hears himself since the selection of whom he shall hear is made from the PCM words of all the other (i.e. N−1) conferees.

21 Claims, 4 Drawing Figures

DIGITAL CONFERENCE CIRCUIT

This invention relates generally to telephone conferencing circuits, and more particularly to telephone conferencing circuits employing digital techniques and wherein the digital signals involved are neither summed nor decoded for the purposes of conferencing.

Conferencing circuits are well known in the field of telephony. In general terms, a conference circuit is a circuit for allowing three or more parties (or conferees) to talk to one another at the same time. For the purposes of this description, a conference circuit will also include a conversation between two parties, since one embodiment of the invention to be described allows for conversations between two to five conferees.

Early conference circuits, employed in analogue telephone systems, provided conferencing by summing all the signals of all the participants and transmitting this resultant signal to all the conferees, with the exception of the talker who received the resultant signal minus his own signal. As the telephone technology advanced into the world of digital techniques, simple summing and subtracting no longer provided an easy solution to the problem of conferencing.

Some prior art approaches to conferencing with digital techniques were simply to convert the digital signals to analogue signals, perform an analogue conferencing, and re-convert the resultant analogue conference signal into a digital signal. One example of such an approach is shown in U.S. Pat. No. 3,970,797 dated July 20, 1976 to D. A. Johnson and Wm. C. Towle. It is, however, cumbersome to conference in this manner if it is possible to conference directly in digital format. Additionally, the converting to analogue and reconverting to digital adds distortion to the signals involved.

An improvement of the analogue summing of signals for conferencing is to do the summing directly with digital signals. Since the digital signals are commonly not linear, but rather are Pulse Code Modulated (PCM, e.g. the $\mu$-255 code is used in North America), it is necessary to first linearize the digital signals, add them, and then re-code (all the while remaining in the digital domain). U.S. Pat. No. 3,924,082 dated Dec. 2, 1975 to S. E. Oliver and N. R. Winch describes one such system.

A further modification in conferencing circuits is to provide a digital conferencing circuit which performs the conferencing function directly using the coded digital signals. U.S. Pat. No. 4,007,338 dated Feb. 8, 1977 to D. W. McLaughlin, U.S. Pat. No. 4,022,991 dated May 10, 1977 to M. J. kelly et al, and U.S. Pat. No. 4,031,328 dated June 21, 1977 to S. G. Pitroda, all depict such a conferencing circuit.

The aforementioned conference circuit of the wholly digital type (exemplified by U.S. Pat. No. 4,007,338) is well described at column 2, lines 34 to 52 of U.S. Pat. No. 4,007,338, wherein it is stated:

"In other words, assuming, for example that channels 3, 5 and 9 are engaged in a 3-way conference, during the channel 3 time slot, the samples from channel 5 and channel 9 are read and compared, and the larger of the two samples is transmitted to channel 3. Subsequently, during the channel 5 time slot, the samples from channel 3 and channel 9 are read and compared, and the larger of the two samples is transmitted. During the channel 9 time slot, the operation is repeated, with the largest of the channel 3 and 5 samples being transmitted. It can be seen that during each channel time slot, the incoming information is written into the fixed channel number in the information memory and the outgoing information is read from some other channel specified in the control memory. This operation of writing and reading the information memory goes on continuously during each channel. The next time frame, new PCM [pulse code modulation] samples are written into the information memory."

The conference circuit disclosed and claimed herein, produces the same result as does the just described conference circuit of U.S. Pat. No. 4,007,338; i.e. assuming a three-way conference between channels 3, 5 and 9, during the channel 3 time slot the samples from channels 5 and 9 (previously stored) are compared and the larger of the two samples is transmitted to channel 3, etc.

However, the conference circuit of the present invention performs this operation in a different manner, which is made more apparent later in this description, and performs it with circuitry that is much less complicated and involved. In simplistic terms, the conference circuit of U.S. Pat. No. 4,007,338 requires memory for each conferee and it operates on the stored data in a parallel fashion. The conference circuit of the present invention requires memory for only $N-1$ of N conferees, and it operates on the stored data in a serial fashion. In short, the present invention provides a relatively simple apparatus and method for conferencing in the digital domain.

In simplistic terms, one embodiment of the present invention provides for a three party conference in the following manner. A digital time slot interchanging network (i.e. a time switch) intermediate the digital switching network and the conference circuit functions to present the TDM (time division multiplex) PCM signals for the three conferees on a common PCM bus, each PCM signal in a distinct time slot on the bus. The conference circuit itself comprises two eight-bit shift registers connected in a series circuit relationship. The first eight-bit shift register is selectively responsive to the signals (i.e. PCM words) appearing on the PCM bus only during the time slots of the three conferees. The second eight-bit shift register is selectively responsive to the signals stored in the first shift register and receives signals from the first shift register whenever the first shift register is receiving data. The contents of the two shift registers are examined and the contents of the register containing the largest magnitude binary number (ignoring the sign) is output to a transmit PCM bus. This transmit PCM bus is interfaced with a digital time slot interchanging network (i.e. a time switch) to match the time slots of the conference circuit with the time slots of the respective conferees in the digital switching network.

The following simple example will help to illustrate more clearly the operation of the invention. Assume that there are three callers (or conferees) AA, BB and CC who desire a conference or three party call. When the proper interconnections are made in a digital switching network the circuit functions as follows: the speech waveforms of conferees AA, BB and CC are sampled periodically (e.g. 8000 times per second) and encoded to produce digital (i.e. PCM) speech samples. The resultant PCM speech samples are interleaved (i.e. time multiplexed) so that several encoded waveforms can be carried on one PCM bus. PCM samples from conferee AA appear on the bus only during time slot A;

PCM samples from conferee BB appear on the bus only during time slot B; and PCM samples from conferee CC appear on the bus only during time slot C. In the general case, these time slots can appear on any PCM buses in the switching network.

In order to provide the conferencing function, the first step is to gather the time slots from the three conferees onto a common PCM bus and assign each one a distinct time slot. This function is performed by the digital time slot interchanging network (i.e. time switch) such that party AA is assigned time slot X on the common conference bus, party BB is assigned time slot Y on the common conference bus, and party CC is assigned time slot Z on the common conference bus. Assuming the repetitive cyclic order of X, Y and Z for the time slots, the information in time slot X (i.e. party AA) is stored in the first shift register. When time slot Y appears, the contents of the first register are shifted into the second register and the contents of time slot Y (i.e. party BB) are stored in the first register. When time slot Z appears, the contents of the first register are shifted into the second register and the contents of time slot Z (i.e party CC) are stored in the first register, etc., for subsequent time slots X, Y and Z until the call is terminated. Just before the time that the first time slot Z appears, a decision is made as to the absolute magnitudes of the digital numbers stored in the two registers. The contents of the register having the largest digital number (ignoring sign) are applied to the transmit PCM bus of the conference circuit, during time slot Z. A digital time slot interchanging network interfaces the transmit PCM bus with the digital switching network so that time slot Z is connected to the time slot of party CC in the switching network, etc.

Stated in other terms, the present invention is a conference circuit for connection in a digital telephone system intermediate a first TDM bus for carrying, in N distinct time slots, PCM words from N parties to the conference circuit, and a second TDM bus for carrying, in N distinct time slots, PCM words from the conference circuit to the N parties, wherein N is a positive integer, $2 \leq N \leq 128$, the conference circuit comprising: serial storage means for storing the $N-1$ most recent PCM words received from the first TDM bus during $N-1$ of the N time slots; circuit means for determining, according to a predetermined criterion, which one of the PCM words stored in the storage means meets the criterion; routing means for routing the PCM word meeting the criterion to the second TDM bus in the next one of the N time slots.

Stated in yet other terms, the present invention is a conference circuit for connection in a digital telephone system intermediate a first TDM bus for carrying, in N distinct time slots of each frame, PCM wods from N parties to the conference circuit, and a second TDM bus for carrying, in N distinct time slots of each frame, PCM words from the conference circuit to the N parties, wherein N is a positive integer, $2 \leq N \leq 5$, the conference circuit comprising: $N-1$ shift registers for storing the $N-1$ most recent PCM words received from the first TDM bus, during $N-1$ of the N time slots; magnitude comparator means for determining which one of the shift registers contains the PCM word having the largest absolute binary value; routing means for routing the contents of the shift register containing the PCM word having the largest absolute binary value to the second TDM bus in the next one of the N time slots.

Expressed in still other terms, the present invention is a method of providing a conference circuit interconnection in a digital telephone system for an N party conference, wherein N is a positive integer, $2 \leq N \leq 32$, and wherein the telephone system has a first TDM bus for carrying, in N distinct time slots of each frame, PCM words from N parties to the conference circuit, and a second TDM bus for carrying, in N distinct time slots of each frame, PCM words from the conference circuit to the N parties, the method comprising: storing the $N-1$ most recent PCM words received on the first TDM bus during $N-1$ of the N time slots; determining, according to a predetermined criterion, which one of the $N-1$ PCM words that have been stored meets the criterion; outputting on the second TDM bus, during the next one of the N time slots, the PCM word meeting the criterion.

The invention will now be described in more detail with reference to the accompanying drawings, wherein like parts in each of the several figures are identified by the same reference character, and wherein.

Figure 2:
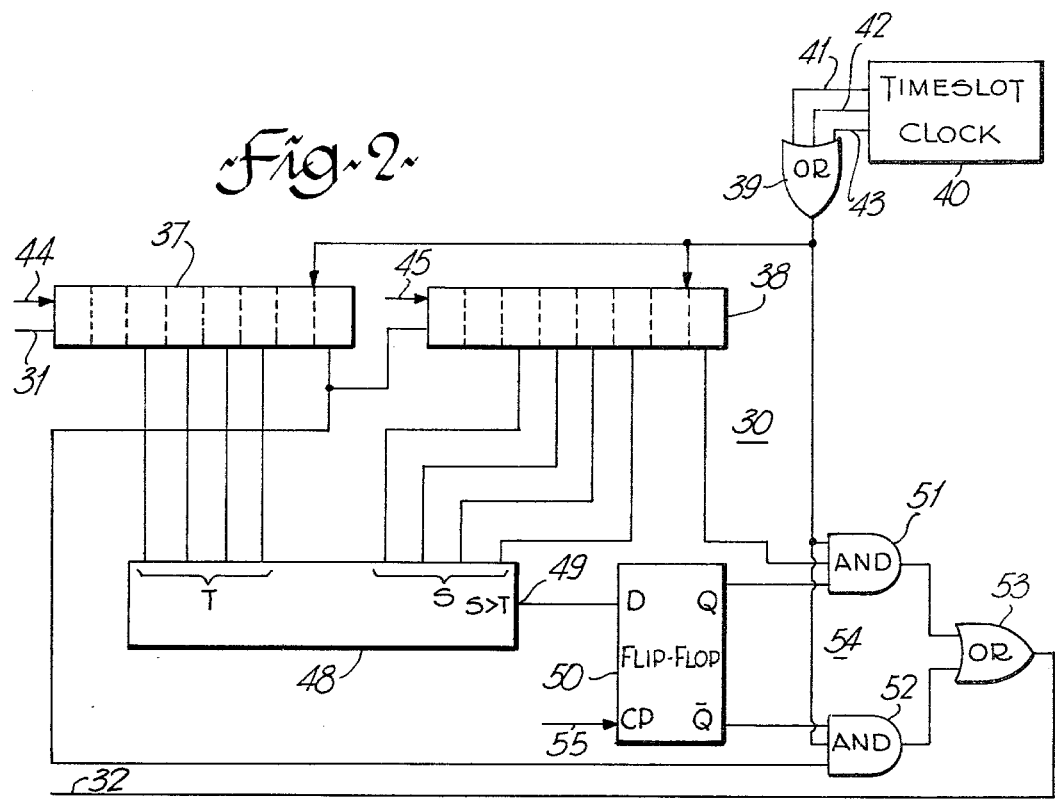
FIG. 2 is a simplified block diagram of the preferred embodiment of the present invention for a three-party conference circuit.
Figure 3:
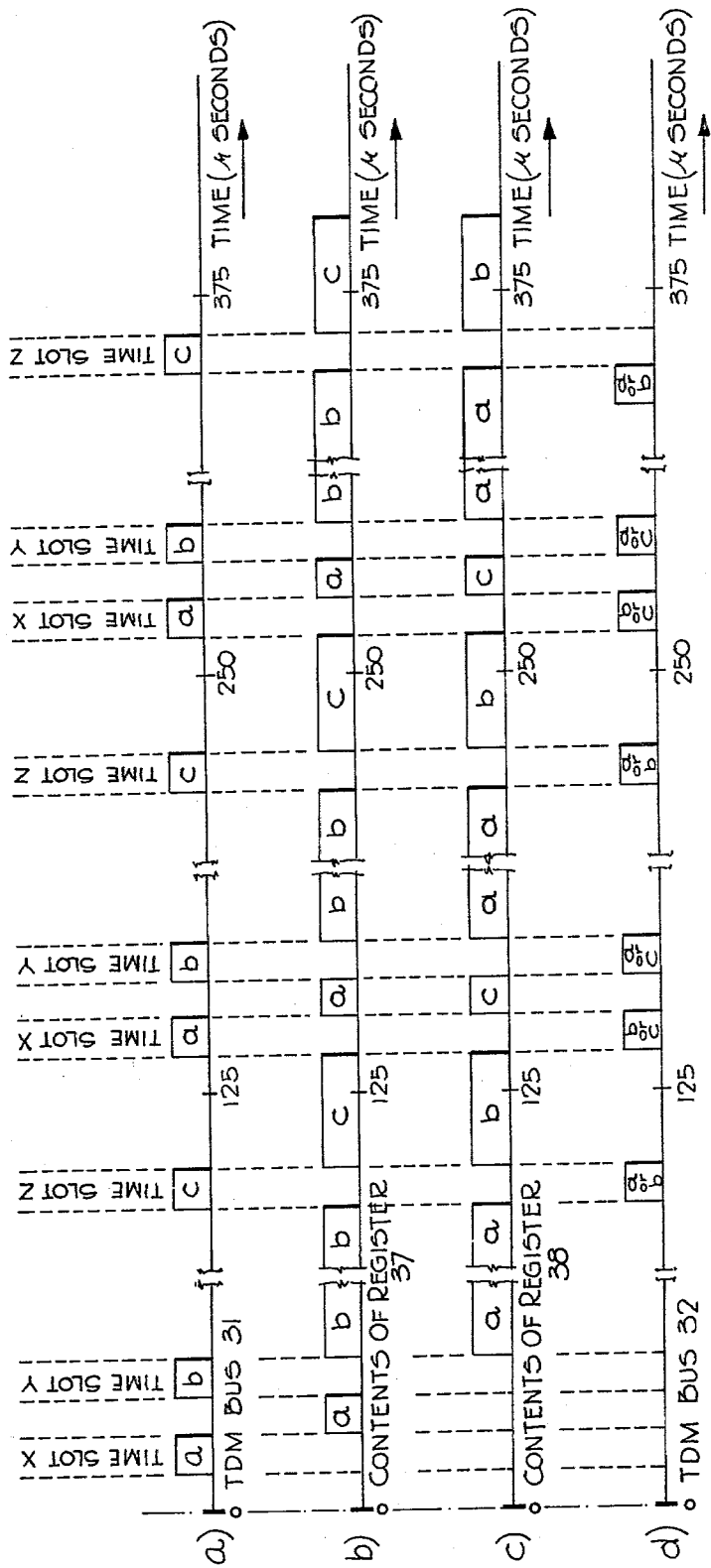
Figure 4:
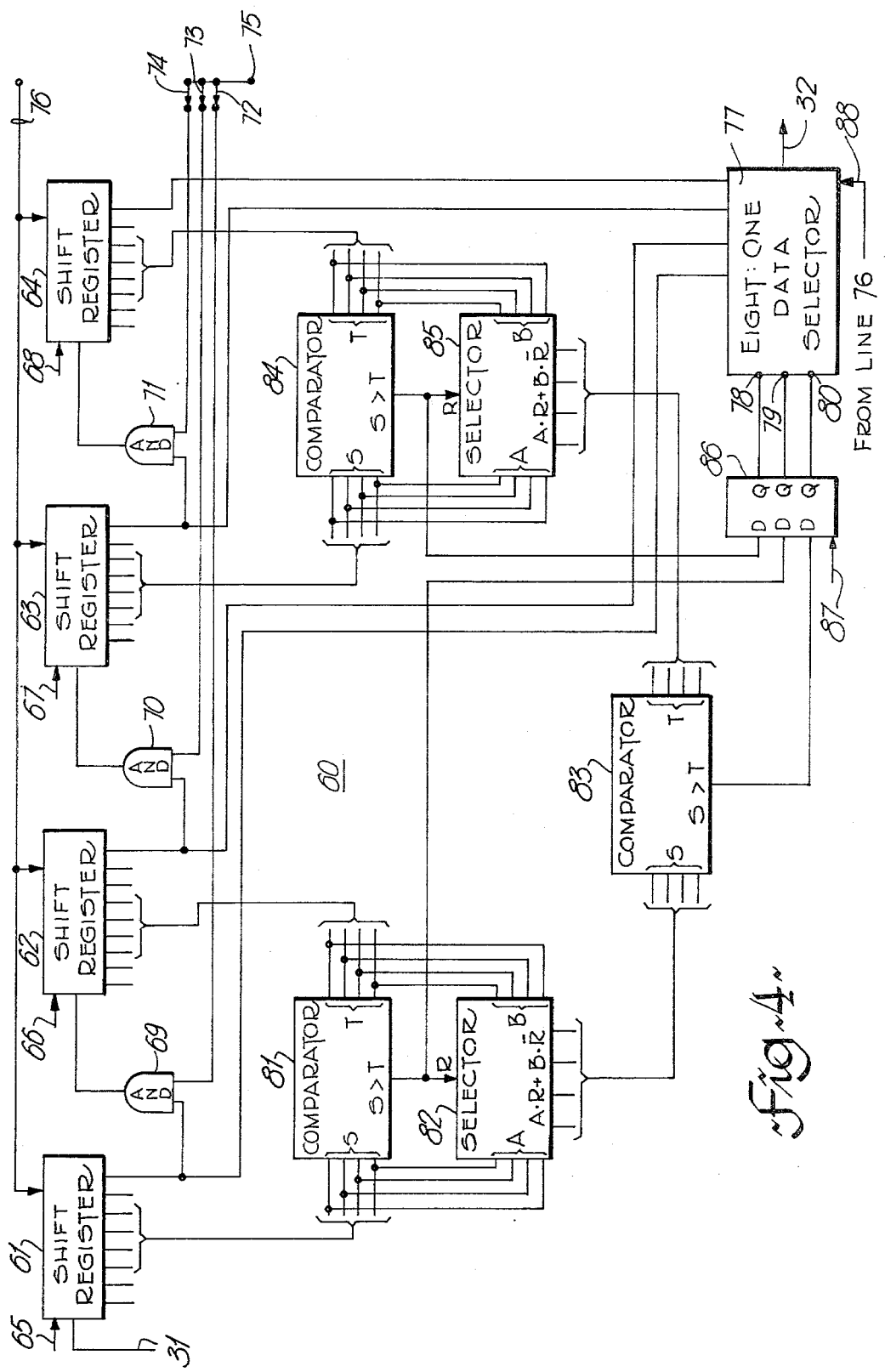

FIG. 3, comprising parts a, b, c and d, is a timing diagram, useful for understanding the operation of the circuit depicted in FIG. 2;

FIG. 4 is a simplified block diagram of the preferred embodiment of the present invention for a conference circuit having between two and five conferees.

Figure 1:
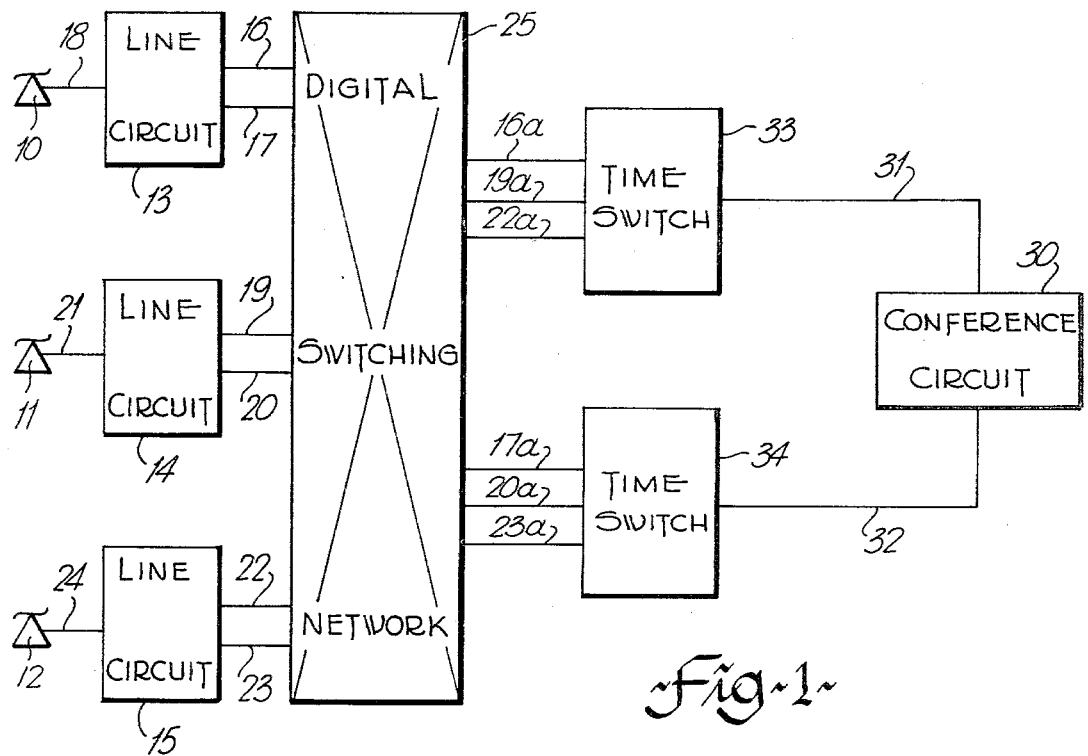
FIG. 1 is a greatly simplified block diagram of a typical telephone system showing the interconnection therewith of the present invention.

The conference circuit of the present invention will first be described in general terms in the context of the environment in which it operates, as exemplified by FIG. 1. FIG. 1 depicts three telephone sets 10, 11 and 12 which are employed by three conferees, one conferee per telephone set. Each telephone set 10, 11 and 12 has associated with it a line circuit 13, 14 and 15 respectively, as is well known. Line circuit 13 converts the analogue signal that it receives from telephone set 10 to a PCM (pulse code modulation) signal on a TDM (time division multiplex) line 16. Additionally, line circuit 13 converts the digital PCM signals received on line 17 into analogue signals and relays these analogue signals to telephone set 10 via analogue line 18. Line circuit 14 functions in a similar manner with lines 19, 20 and 21 corresponding respectively to lines 16, 17 and 18; similarly line circuit 15 functions in a similar manner with lines 22, 23 and 24 corresponding respectively to lines 16, 17 and 18. Digital switching network 25 is any standard digital switching network that would serve to interconnect any of the telephone sets 10, 11 and 12 together, in a one-to-one relationship to permit a two-party interconnection. As a detailed description of digital switching network 25 is not required for an understanding of the present invention, its operation will not be described further.

Conference circuit 30 is connected intermediate a conference receive TDM bus 31 and a conference transmit TDM bus 32 as shown in FIG. 1. TDM bus 31 and TDM bus 32 are each a time division multiplex bus providing thirty-two time slots, each time slot containing one 8-bit PCM word. Time switch 33 interfaces the receive TDM bus 31 and the lines 16a, 19a and 22a from switching network 25. Line 16a carries, in a particular time slot, the information from line 16, after it has been switched by switching network 25. Similarly, line 19a carries, in a particular time slot, the information from line 19, and line 22a carries, in a particular time slot, the information from line 22.

The function of time switch 33 is to interconnect the information (i.e. PCM word) contained in a particular time slot on line 16a with one particular and distinct time slot on TDM bus 31. Similarly, time switch 33 functions to interconnect the information contained in a particular time slot on line 19a with one particular time slot on TDM bus 31, different from the time slot assigned to the PCM word from line 16a. And finally, time switch 33 functions in a similar manner to assign to the time slot of interest on line 22a a distinct time slot on TDM bus 31 distinct and different from the time slots assigned to the PCM words from lines 16a and 22a. This can be seen in FIG. 3a, wherein the time slots of interest on TDM bus 31 are indicated by the letters X, Y and Z.

The operation of conference circuit 30 will be discussed later in greater detail in conjunction with FIG. 2. In simplistic terms, conference circuit 30, in the three-party conference depicted in FIG. 1, receives PCM words to be conferenced during three different time slots (i.e. X, Y and Z) out of the thirty-two time slots available on TDM bus 31. Conference circuit 30 selects (according to a criterion to be discussed later) one PCM word which has been received during one of the time slots of interest and outputs that PCM word on transmit TDM bus 32. Time switch 34 serves to assign (or allocate) one time slot of interest on bus 32 to the appropriate time slot on line 17a. Similarly, time switch 34 allocates the remaining two time slots of interest on bus 32 appropriate time slots on lines 20a and 23a, respectively. Line 17a is connected to line 17 via switching network 25, and similarly, lines 20a and 23a are connected to lines 20 and 23 respectively via switching network 25.

FIG. 2 depicting, in simplified form, the actual circuitry of conference circuit 30 will now be described. The circuitry is interconnected as shown in FIG. 2 and attention is directed to it. FIG. 3 contains waveforms helpful in understanding the operation of FIG. 2 and it may be useful to refer to FIGS. 2 and 3 simultaneously.

The 8-bit shift registers 37 and 38 are enabled by a logic signal from OR gate 39. OR gate 39 is responsive to three signals from time slot clock 40. Clock 40 is designed to output a high logic signal on each of its output lines (only three of which are shown) for the duration of the time slots of interest. In other words, line 41 carries a high logic signal only for the duration of time slot X, line 42 carries a high logic signal only for the duration of time slot Y, and line 43 carries a high logic signal only for the duration of time slot Z. Clock pulses (from a bit clock, not shown) are applied continuously to clock pulse inputs 44 and 45 of shift registers 37 and 38 resepectively. The clock pulses have a frequency of eight times every time slot and there are thirty-two time slots for each 125 microsecond frame.

Let the time slot of interest on line 16a (FIG. 1, i.e. the time slot on line 16a carrying information from telephone set 10) be referred to as time slot A, containing a PCM word "a." Similarly, let the time slot of interest on line 19a be referred to as time slot B containing a PCM word "b," and the time slot of interest on line 22a be referred to as time slot C containing a PCM word "c."

Time switch 33 (FIG. 1) has switched or rearranged time slots A, B and C so that they now appear during time slots X, Y and Z respectively, of TDM bus 31 (see FIG. 3a). It should be noted that the time slots X, Y and Z can be any three different time slots of the thirty-two time slots (or channels) available on TDM bus 31.

As can be seen from FIG. 3a the PCM word "a," originally in time slot A, appears in the second time slot of the frame, i.e. time slot X of TDM bus 31. PCM word "a" is stored in 8-bit shift register 37. FIG. 3b depicts the contents of shift register 37, and from FIG. 3b it can be seen that word "a" has been completely entered into register 37 at the end of time slot X and it is stored in register 37 until the beginning of time slot Y. At the beginning of time slot Y, word b starts to be entered into register 37 and is completely entered by the end of time slot Y. At the same time that word b is being entered into register 37, word a is being shifted out of register 37 and into register 38. At the end of time slot Y, when word b has been completely entered into register 37, word a has been completely entered into register 38 (see FIG. 3c). Words a and b are stored in registers 38 and 37 respectively until the beginning of time slot Z.

During the interval just before words a and b are completely entered into registers 38 and 37 respectively, magnitude comparator 48 compares the magnitude of the four most significant bits, exclusive of the sign bit, of each word a and b in the registers 38 and 37 respectively. It should be noted that this magnitude comparison occurs before the PCM words "a" and "b" are completely entered into their respective shift registers. This can be seen from FIG. 2 since the T input of comparator 48 is connected to the third through sixth bit locations (counting from the left of the shift register) of register 37; the S input of comparator 48 is similarly connected to the third through sixth bit locations of register 38. Consequently, when comparator 48 makes the comparison of interest, the four most significant bits of the PCM word are contained in the third through sixth bit locations of registers 37 and 38, the seventh bit location of the register contains the sign bit and the eighth bit location contains the least significant bit of the preceding PCM word stored in the register.

Magnitude comparator 48 provides a digital indication (logic high or low) on its output terminal 49 indicative of which register 37 or 38 contains the PCM word having the larger magnitude (ignoring sign). The output on terminal 49 is high if $S > T$, otherwise the output is low. In the event that $S = T$, the output on terminal 49 is low, thereby giving priority to the contents of register 37.

The D terminal of D-type flip-flop 50 is responsive to the logic signal appearing on the output terminal 49 of magnitude comparator 48. Flip-flop 50 has a clock pulse input 55 from a channel clock (not shown). The channel clock, applied to input 55, supplies one pulse every time slot, coinciding with the last bit pulse of the time slot and of the same duration as the bit pulse (recall that each time slot, or channel, has eight bit pulses as produced by the bit clock, and there are thirty-two time slots to one frame). Consequently, flip-flop 50 changes its output state only once per time slot, during the time period of the last bit of the time slot so as to have the correct output for application to AND gates 51 and 52 at the beginning of a new time slot.

Flip-flop 50, AND gate 51, AND gate 52, and OR gate 53 form a routing circuit 54. Routing circuit 54 is interconnected as shown in FIG. 2 and functions to shift either the PCM word stored in the register 37 to TDM bus 32 or the PCM word stored in register 38 to TDM bus 32, during the time period that the output of OR gate 39 is high. Recall that the output of OR gate 39 is high (i.e. the circuitry is enabled) only during time slots X, Y and Z. Consequently, a word is output on TDM bus 32 only during time slots X, Y and Z. This can be seen in FIG. 3d.

Time switch 34 (FIG. 1) allocates or switches the PCM words appearing on TDM bus 32 so that during time slot Z, the PCM word (a or b) appearing on TDM bus 32 at that time period is switched to the appropriate time slot on line 23a; during time slot X, the word (b or c) appearing on TDM bus 32 at that time period is switched to the appropriate time slot on line 17a; and during time slot Y, the word (a or c) appearing on TDM bus 32 at the time period is switched to the appropriate time slot on line 20a.

The operation of conference circuit 30 can be summarized in simplistic terms as follows. PCM words are continually appearing at the input of shift register 37 via TDM bus 31. Only during the time slots X, Y and Z of bus 31 are the shift registers 37 and 38 enabled so as to receive selectively the appropriate PCM words applied to the shift registers. In the simplistic example described previously, a PCM word "a," appearing during time slot X is entered into register 37. During the next time slot of interest on TDM bus 31, i.e. time slot Y, PCM word "b" is entered into register 37, and the PCM word "a" previously contained in register 37 is shifted into register 38. The magnitude comparator 48 compares the four most significant bits of the PCM words stored in registers 37 and 38 (i.e. PCM words a and b) to determine which PCM word is the largest (excluding sign) and produces a logic output signal at its output terminal 49 indicative of this. Routing circuit 54 is responsive to the output of magnitude comparator 48 and routes the largest PCM word (a or b) to the transmit TDM bus 32 during the next time slot of interest, i.e. during time slot Z.

During time slot Z, PCM word c appears on TDM bus 31 and is entered into register 37. PCM word b, previously contained in register 37, is shifted into register 38. PCM word "a" previously contained in register 38 is either routed via routing circuit 54 (in particular, via AND gate 51 and OR gate 53) to TDM bus 32 if it were the largest of PCM words a and b or else it is simply "lost." If PCM word b were the largest, as well as getting shifted into register 38, PCM word b would also get routed via routing circuit 54 (in particular, via AND gate 52 and OR gate 53) to TDM bus 32.

During the next time slot X, another PCM word a is introduced into register 37, PCM word c, previously contained in register 37 is shifted into register 38, and PCM word b, previously contained in register 38 is shifted out. The same selection of the largest PCM word (ignoring sign) contained in registers 37 and 38 occurs, and the largest of the PCM words contained in the registers is routed to TDM bus 32, etc.

While the conference circuit 30 of FIG. 2 is the preferred one envisaged by the inventors for their particular application, variations can be made therein. One modification would be to use more than just the four most significant bits (excluding the sign bit) to determine which PCM word contained in a register has the largest numerical value. The five most significant bits, or the six most significant bits of the PCM word could be used in the determination of the largest value. It would also be possible to use less than four bits to determine the PCM word having the largest absolute value.

FIG. 4 will now be discussed. The conference circuit 60 of FIG. 4 operates on the same principles as does the conference circuit 30 of FIG. 2. Conference circuit 60 is capable of handling a conference call of between two and five parties; as a consequence its circuitry is more complex than that of conference circuit 30, but since the basic principle is the same, conference circuit 60 will not be described in great detail.

As with conference circuit 30 (FIG. 2), conference circuit 60 is connected between TDM bus 31 and TDM bus 32 as shown in FIG. 4. Shift registers 61, 62, 63 and 64 operate in a similar fashion to shift registers 37 and 38 of circuit 30 (FIG. 2). Each shift register 61, 62, 63 and 64 has a clock pulse input 65, 66, 67 and 68 respectively from a bit clock (not shown); the bit clock produces clock pulses having a frequency of eight times every time slot and there are thirty-two time slots in each 125 microsecond frame. Since conference circuit 60 can handle a two-party, a three-party, a four-party, or a five-party conference, AND gates 69, 70 and 71 along with switches 72, 73 and 74 are required. The circuit of FIG. 4 is depicted with the switches 72, 73 and 74 all closed so as to provide a five-party conference. When closed, as shown in FIG. 4, switches 72, 73 and 74 apply a high logic signal, from terminal 75, to the AND gates 69, 70 and 71 respectively. If switch 74 were open, a four-party conference would be provided by conference circuit 60, if switches 73 and 74 where open a three-party conference would be provided by circuit 60, and if all the switches 72, 73 and 74 were open, a two-party conference would be provided by circuit 60. In short, when a high logic signal is not applied to one of the AND gates 69, 70 and 71, that AND gate blocks signals from reaching the subsequent shift register and thereby limits the number of parties (or conferees) that circuit 60 can accommodate. The number of conferees (or parties) handled by circuit 60 is the number of consecutive shift registers functioning in the circuit plus one. It should be noted that switches 72, 73 and 74 are shown in FIG. 4 in simplified form and this function would normally be provided by solid-state switches. Additionally, the switches 72, 73 and 74 would normally be controlled so that they are closed or open in the following pattern: all switches 72, 73 and 74 are open; switch 72 is closed, switches 73 and 74 are open; switches 72 and 73 are closed, switch 74 is open; and all switches 72, 73 and 74 are closed. This provides of course two-party, three-party, four-party and five-party conferences, respectively. The shift registers 61, 62, 63 and 64 are enabled via high logic on line 76 which carries logic signals analogous to the ones produced by OR gate 39 of FIG. 2; i.e. the registers 61, 62, 63 and 64 are enabled only during the time slots of interest.

The output of each shift register 61, 62, 63 and 64 is applied to the eight-to-one data selector 77. As its name implies, eight-to-one data selector 77 has eight switches inputs (only four of which are shown) and one output (i.e. TDM bus 32). The logic signals applied to control terminals 78, 79 and 80 determine which one of the eight input terminals is connected to the output. In circuit 60 of FIG. 4, this means that selector 77 functions to route a PCM word contained in one of the shift registers 61, 62, 63 and 64 to TDM bus 32. Enable input 88 receives logic signals from line 76 so that an output appears on TDM bus 32 only during the appropriate time slots.

The control signals to be applied to terminals 78, 79 and 80 are determined as follows. Comparator 81 receives on its S input the four most significant logic bits from the PCM word contained in register 61 and, on its T input, comparator 81 receives the four most significant logic bits from the PCM word contained in register 62. If the binary value of the bits on the S input is larger than the binary value of the bits on the T input the output of comparator 81 is a logic high, otherwise it is a logic low. Selector 82 functions to route the four most significant binary bits that had the largest value as determined by comparator 81 to another comparator 83. This process is accomplished by selector 82 performing the Boolean algebra operation $A \cdot R + B \cdot \bar{R}$ to the signals appearing at its inputs A, B and R.

Comparator 84 and selector 85 make a similar selection based on the PCM words contained in registers 63 and 64. Comparator 83 then makes the final comparison between its S and T inputs with its S input receiving the four most significant bits (excluding sign) of the larger PCM word from registers 61 and 62, and its T input receiving the four most significant bits (excluding sign) of the larger PCM word from registers 63 and 64.

Three bit latch 86 functions to keep track of which shift register contains the largest PCM word and to transmit this data, in the form of a three-bit binary number to eight-to-one data selector 77 to control the operation of selector 77. One input of three-bit latch 86 is responsive to the output of comparator 83, another input of latch 86 is responsive to the output of comparator 81, and the final input of latch 86 is responsive to the output of comparator 84. Latch 86 has a clock pulse input 87 from a channel clock (not shown). The channel clock, applied to input 87, supplies one pulse every time slot, coinciding with the last bit pulse of the time slot and of the same duration as the bit pulse (recall that each time slot, or channel, has eight bit pulses as produced by the bit clock, and there are thirty-two time slots to one frame). Consequently, latch 86 changes its output state only once per time slot, during the time period of the last bit of the time slot so as to have the correct output for applying to selector 77 at the beginning of a new time slot.

The equipment employed in the preferred embodiments of FIGS. 2 and 4 is as follows:
Comparators 48, 81, 83, 84: Texas Instruments No. 7485
Shift Registers 37, 38, 61, 62, 63, 64: Texas Instruments No. 74164
Selectors 82, 85: Texas Instruments No. 74157
Three bit latch 86: Texas Instruments No. 74175
Eight-to-one Data Selector 77: Texas Instruments No. SN74151.

While the conference circuit 60 of FIG. 4 is the preferred one envisaged by the inventors for their particular application, variations can be made therein. One modification would be to have up to thirty-two conferees; or even more depending upon the equipment used. The number of conferees is limited (on technical grounds) solely by the number of time slots available in one frame; the maximum number of conferees that a conference circuit constructed according to the present invention can handle is equal to the number of time slots available in one frame. One main telephone system in use today employs thirty-two time slots per frame. Consequently, the maximum number of conferees is limited to thirty-two. It should be noted that a conference cell with thirty-two participants (or conferees), while technically possible using the present invention, would likely be too unwieldly due to the human factors involved, and a conference call would most likely have fewer participants than thirty-two. It should also be noted that internally some telephone systems employ more than thirty-two time slots per frame. For example, Western Electric's number 4 ESS employs 128 time slots per frame, and in that case the maximum number of conferees would be 128 (although it is very unlikely that a conference call of this magnitude would be made).

It should also be noted that instead of employing the shift registers of FIGS. 2 and 4 a tapped delay line could also be used (being tapped after every 8 bits).

What is claimed is:

1. A conference circuit for connection in a digital telephone system intermediate a first TDM (time division multiplex) bus for carrying, in N distinct time slots, PCM (pulse code modulation) words to said conference circuit, and a second TDM bus for carrying, in N distinct time slots, PCM words from said conference circuit, wherein N is a positive integer, $2 \leq N \leq 128$, said conference circuit comprising:
 serial storage means for storing the N−1 most recent PCM words received from said first TDM bus during N−1 of said N time slots;
 circuit means for determining, according to a predetermined criterion, which one of said PCM words stored in said storage means meets said criterion; and
 routing means for routing the PCM word meeting said criterion to said second TDM bus in the next one of said N time slots.

2. The conference circuit of claim 1 wherein said serial storage means are N−1 shift registers, interconnected in a series circuit relationship.

3. The conference circuit of claim 1 or 2 wherein said predetermined criterion is the binary value of the PCM words contained in said serial storage means.

4. The conference circuit of claim 2 wherein said predetermined criterion is the largest binary value of the PCM words contained in said N−1 shift registers as determined by the M most significant bits of the PCM word, excluding the sign bit, wherein M is a positive integer, $2 \leq M \leq 6$.

5. The conference circuit of claim 4 wherein M equals four.

6. The conference circuit of claim 4 wherein $2 \leq N \leq 32$.

7. The conference circuit of claim, 1 4 or 5 wherein N equals three.

8. The conference circuit of claim 1, 4 or 5 wherein N equals five.

9. A conference circuit for connection in a digital telephone system intermediate a first TDM (time division multiplex bus for carrying, in N distinct time slots of each frame, PCM (pulse code modulation) words to said conference circuit, and a second TDM bus for carrying, in N distinct time slots of each frame, PCM words from said conference circuit, wherein N is a positive integer, $2 \leq N \leq 5$, said conference circuit comprising:
 N−1 shift registers for storing the N−1 most recent PCM words received from said first TDM bus, during N−1 of said N time slots;
 magnitude comparator means for determining which one of said shift registers contains the PCM word having the largest absolute binary value; and
 routing means for routing the contents of the shift register containing the PCM word having the largest absolute binary value to said second TDM bus in the next one of said N time slots.

10. The conference circuit of claim 9 wherein said N−1 shift registers are interconnected in a series circuit relationship such that the PCM word contained in one shift register is output to the next shift register in the series, during the next one of said N time slots, while the first shift register in the series receives a PCM word from said first TDM bus.

11. The conference circuit of claims 9 or 10 wherein N equals three.

12. A conference circuit for connection in a digital telephone system intermediate a first TDM (time division multiplex) bus for carrying, in N distinct time slots of each frame, PCM (pulse code modulation) words to said conference circuit, and a second TDM bus for carrying, in N distinct time slots of each frame, PCM words from said conference circuit, wherein there is a one-to-one correspondence between the time slots on said first and second TDM buses, and wherein N is a positive integer, $2 \leq N \leq 5$, said conference circuit comprising:

N−1 shift registers, connected in a series circuit relationship, for storing the N−1 most recent PCM words received from said first TDM bus, during N−1 of said N time slots;

said shift registers interconnected in a series circuit relationship such that the PCM word contained in one shift register is output to the next shift register, in the series circuit relationship, during the next one of said N time slots, while, during the same time slot, the first shift register in the series circuit relationship receives a PCM word from said first TDM bus;

magnitude comparator means for determining which one of said N−1 shift registers contains the PCM word having the largest binary value, based upon the M most significant bits of the PCM word, excluding the sign bit, wherein M is a positive integer, $2 \leq M \leq 6$; and routing means for routing the contents of the shift register containing the PCM word having the largest absolute binary value to said second TDM bus in the next one of said N time slots.

13. The conference circuit of claim 12 wherein N equals three and M equals four.

14. The conference circuit of claim 12 or 13 further including a first time switch for connecting each of said N time slots on said first TDM bus to an appropriate time slot in a digital switching network of said digital telephone system, and a second time switch for connecting each of said N time slots on said second TDM bus to an appropriate time slot in the digital switching network of said digital telephone system.

15. A conference circuit for connection in a digital telephone system intermediate a first TDM (time division multiplex) bus for carrying, in three distinct time slots of each frame, PCM (pulse code modulation) words to said conference circuit, and a second TDM bus for carrying, in three distinct time slots of each frame, PCM words from said conference circuit, said conference circuit comprising:

a first shift register for sequentially receiving the PCM words occurring in said three distinct time slots on said first TDM bus, and storing each said PCM word until the next occurrence of one of said three time slots, at which time said PCM word is shifted out of said shift register and the next said PCM word is shifted into said shift register;

a second shift register, responsive to the output of said first shift register, for sequentially receiving, and temporarily storing, until the next PCM word is received, the PCM words output from said first shift register;

a magnitude comparator means for comparing the magnitude of at least the most significant bits, exclusive of sign bits, of the PCM words stored in said first and said second shift registers and for providing a signal indicative of which shift register contains the PCM word having the largest absolute binary value; and routing means, responsive to the output of said magnitude comparator means for selectively routing the contents of the shift register having the largest absolute binary value to said second TDM bus.

16. The conference circuit of claim 15 wherein the four most significant bits are used in determining the largest binary value.

17. The conference circuit of claim 15 or 16 wherein said shift registers are eight-bit shift registers.

18. A method of providing a conference circuit interconnection in a digital telephone system for an N party conference, wherein N is a positive integer, $2 \leq N \leq 32$, and wherein said telephone system has a first TDM (time division multiple) bus for carrying, in N distinct time slots of each frame, PCM (pulse code modulation) words to said conference circuit, and a second TDM bus for carrying, in N distinct time slots of each frame, PCM words from said conference circuit, said method comprising:

storing the N−1 most recent PCM words received on said first TDM bus during N−1 of said N time slots;

determining, according to a predetermined criterion, which one of said N−1 PCM words that have been stored meets said criterion; and outputting on said second TDM bus, during the next one of said N time slots, the PCM word meeting said criterion.

19. The method of claim 18 wherein said predetermined criterion is the PCM word having the largest absolute binary value.

20. The method of claim 18 or 19 wherein $2 \leq N \leq 5$.

21. The method of claim 18 or 19 wherein N equals three.

* * * * *